US011929627B2

United States Patent
Harris et al.

(10) Patent No.: US 11,929,627 B2
(45) Date of Patent: *Mar. 12, 2024

(54) WIRELESS CHARGING APPARATUS

(71) Applicant: Geoffrey Herbert Harris, Chicago, IL (US)

(72) Inventors: Geoffrey Herbert Harris, Chicago, IL (US); David Ellstein, State College, PA (US)

(73) Assignee: Geoffrey Herbert Harris, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,982

(22) Filed: Apr. 20, 2023

(65) Prior Publication Data

US 2023/0253829 A1    Aug. 10, 2023

Related U.S. Application Data

(63) Continuation of application No. 17/570,717, filed on Jan. 7, 2022, now Pat. No. 11,664,683, which is a
(Continued)

(51) Int. Cl.
*H02J 50/12* (2016.01)
*H02J 7/00* (2006.01)
(Continued)

(52) U.S. Cl.
CPC ............. *H02J 50/12* (2016.02); *H02J 7/02* (2013.01); *H02J 50/005* (2020.01); *H02J 50/50* (2016.02); *H02J 7/0044* (2013.01)

(58) Field of Classification Search
CPC ...................................................... H02J 50/50
See application file for complete search history.

(56) References Cited

U.S. PATENT DOCUMENTS 7,986,059 B2 *  7/2011  Randall ............... H02J 50/10
                                                320/108
11,251,642 B2 *  2/2022  Harris ............... H02J 50/005
(Continued)

OTHER PUBLICATIONS

Wang et al. "Wireless Power Transfer: Metamaterials and Array of Coupled Resonators" Mistubishi Electric Research Laboratories website https://www.merl.com/publications/docs/TR2013-054.pdf May 2013, pp. 1-11.
(Continued)

*Primary Examiner* — Drew A Dunn
*Assistant Examiner* — Tynese V McDaniel
(74) *Attorney, Agent, or Firm* — Banner & Witcoff, Ltd.

(57) ABSTRACT

Apparatuses and systems are provided for improving wireless power transmission for mobile devices. An enclosure for a mobile device may include a first electrical coil configured to establish a first wireless coupling with a transmitter coil of a power supply and a second electrical coil configured to establish a second wireless coupling with the first electrical coil and to establish a third wireless coupling with a receiver coil of a mobile device. A distance between the receiver coil and the transmitter coil may exceed a range over which the transmitter coil may be able to transfer power to the receiver coil via a single wireless coupling between the transmitter coil and the receiver coil. The first wireless coupling, the second wireless coupling, and the third wireless coupling, when established, may enable the transmitter coil to perform a wireless power transfer to the receiver coil.

20 Claims, 6 Drawing Sheets

Related U.S. Application Data continuation of application No. 16/358,891, filed on Mar. 20, 2019, now Pat. No. 11,251,642.

(51) Int. Cl.
  *H02J 7/02* (2016.01)
  *H02J 50/00* (2016.01)
  *H02J 50/50* (2016.01)

(56) References Cited

U.S. PATENT DOCUMENTS

| | | | | |
|---|---|---|---|---|
| 11,664,683 | B2* | 5/2023 | Harris | H02J 7/02 320/108 |
| 2009/0230777 | A1* | 9/2009 | Baarman | H04B 5/0037 307/104 |
| 2014/0014732 | A1* | 1/2014 | Finn | G06K 19/07783 235/492 |
| 2016/0064979 | A1* | 3/2016 | Huang | H02J 7/0071 320/114 |
| 2016/0094078 | A1* | 3/2016 | Graham | H02J 50/90 320/108 |
| 2016/0197520 | A1* | 7/2016 | Akuzawa | H02J 50/05 307/104 |
| 2016/0329753 | A1* | 11/2016 | Gluzman | H02J 50/502 |
| 2016/0336806 | A1* | 11/2016 | Tsuda | H02J 50/12 |
| 2018/0034327 | A1* | 2/2018 | Ren | H01F 38/14 |
| 2018/0323655 | A1* | 11/2018 | Hosotani | H02J 50/12 |
| 2020/0227935 | A1* | 7/2020 | Mehta | H01M 50/284 |
| 2021/0006339 | A1* | 1/2021 | Eguchi | H04B 5/02 |

OTHER PUBLICATIONS

Carman "Conductive wireless charging might be the future" Circuit Breaker website https://www.theverge.com/circuitbreaker/2016/6/15/11943830/fli-charging-pad-case-indiegogo Jun. 15, 2016, pp. 1-3.
"MagCase for iPhone X" https://www.ipitaka.com/collections/magcase-for-iphone-x website visited Mar. 19, 2019, pp. 1-8.
"Patents" Fli Charge website https://www.flicharge.com/pages/patents visited Mar. 18, 2019, pp. 1-2.
Wireless power consortium "Magnetic Resonance and Magnetic Induction" (Year: 2014) pp. 1-6.
Jun. 17, 2021—(US) Office Action—U.S. Appl. No. 16/358,891.
Oct. 14, 2021—(US) Notice of Allowance—U.S. Appl. No. 16/358,891.
Jan. 24, 2023—(US) Notice of Allowance—U.S. Appl. No. 17/570,717.
Sep. 29, 2022—(US) Non Final Office Action—U.S. Appl. No. 17/570,717.

* cited by examiner

WIRELESS CHARGING APPARATUS

CROSS-REFERENCE TO RELATED APPLICATIONS

This application is a continuation of and claims priority to U.S. patent application Ser. No. 17/570,717, filed Jan. 7, 2022, and entitled "Wireless Charging Apparatus," which is a continuation of U.S. patent application Ser. No. 16/358,891, filed Mar. 20, 2019, and entitled "Wireless Charging Apparatus," the contents of which are incorporated herein by reference in their entirety.

FIELD

Aspects described herein generally relate to wireless power transmission in mobile devices. More specifically, aspects relate to improving wireless charging capabilities of various mobile device enclosures.

BACKGROUND

The use of magnetic induction in wireless charging of mobile devices is conventional. In many instances, an enclosure (e.g., a case, wallet, or the like) may be placed over the mobile device for protection. However, use of an enclosure may limit wireless charging capabilities with mobile devices.

Accordingly, there exists a need for ways to improve wireless charging capabilities for mobile devices that are stored in such enclosures.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed to apparatuses and systems for improving wireless charging capabilities of mobile devices stored in various enclosures.

A first aspect described herein provides a first electrical coil configured to establish a first wireless coupling with a transmitter coil of a power supply. The first aspect described herein also provides a second electrical coil configured to establish a second wireless coupling with the first electrical coil and to establish a third wireless coupling with a receiver coil of a mobile device. In one or more instances, a distance between the receiver coil and the transmitter coil may exceed a range over which the transmitter coil is able to transfer power to the receiver coil via a single wireless coupling between the transmitter coil and the receiver coil. Additionally or alternatively, the distance between the receiver coil and the transmitter coil may diminish power transfer between the transmitter coil and the receiver coil (e.g., cause slower charging). In one or more instances, the first wireless coupling, the second wireless coupling, and the third wireless coupling, when established, may enable the transmitter coil to perform a wireless power transfer to the receiver coil. Additionally or alternatively, the first wireless coupling, the second wireless coupling, and the third wireless coupling, when established, may increase the power transfer between the transmitter coil and the receiver (e.g., cause faster charging).

In one or more instances, the first electrical coil might not be configured to self-resonate. In these instances, a capacitor may be added in parallel with the first electrical coil, which may cause this sub-circuit (e.g., paralleled coil and capacitor) to resonate at a predetermined frequency. In these instances, the second electrical coil may include a second inductor and a second capacitor connected in parallel.

In one or more instances, the first electrical coil and the second electrical coil may be self-resonating coils. In one or more instances, the first electrical coil and the second electrical coil may be integrated into one of: a mobile device case, a mobile device wallet, and a removable portion of a mobile device.

In one or more instances, wireless power transfer via the first wireless coupling, the second wireless coupling, and the third wireless coupling may improve the power transfer and/or efficiency of the power transfer relative to that of a direct coupling between the transmitter coil and the receiver coil. As a result, by implementing the first electrical coil and the second electrical coil, the charging time of a battery may be reduced.

A second aspect described herein provides a first electrical coil configured to establish a first wireless coupling with a transmitter coil of a power supply. The second aspect described herein further provides a second electrical coil configured to establish a second wireless coupling with a receiver coil of a mobile device. In one or more instances, the first electrical coil and the second electrical coil may be connected via a hard wire connection. In one or more instances, a distance between the receiver coil and the transmitter coil may exceed a range over which the transmitter coil may be able to transfer power to the receiver coil via a single wireless coupling between the transmitter coil and the receiver coil. In one or more instances, the first wireless coupling and the second wireless coupling, when established, may enable the transmitter coil to perform a wireless power transfer to the receiver coil.

In one or more instances, the wireless power transfer to the receiver coil may be performed by causing mutual inductance between the transmitter coil and the first electrical coil, and the second electrical coil and the receiver coil.

In one or more instances, the transmitter coil, the first electrical coil, the second electrical coil, and the receiver coil may have identical outer diameters.

In one or more instances, the outer diameters may be greater than a distance between each of the respective coils. In one or more instances, the first electrical coil may include a first inductor connected in parallel to a first capacitor. In these instances, the second electrical coil may include a second inductor connected in parallel to a second capacitor. In one or more instances, the first electrical coil may be connected in parallel to the second electrical coil. In one or more instances, the first electrical coil and the second electrical coil may be integrated into one of: a mobile device case, a mobile device wallet, and a removable portion of a mobile device.

A third aspect of described herein provides a power terminal configured to provide a wireless power transfer to a mobile device when the mobile device is located within a baseline distance of the power terminal. In one or more instances, a mobile device enclosure may be configured to hold the mobile device. In these instances, the mobile device enclosure may include a first electrical coil, magnetically coupled to a transmitter coil of the power terminal, configured to receive the wireless power transfer from the transmitter coil. In these instances, the mobile device enclosure may also include a second electrical coil configured to receive the wireless power transfer from the first electrical coil. In one or more instances, the mobile device may include a receiver coil, may be magnetically coupled to the second electrical coil, and may be configured to receive the wireless power transfer from the second electrical coil.

In one or more instances, the first electrical coil and the second electrical coil may enable the power terminal to provide the wireless power transfer to the mobile device when the mobile device is located within an updated distance of the power terminal, which may be greater than the baseline distance. In one or more instances, the first electrical coil may be magnetically coupled to the second electrical coil. In one or more instances, the first electrical coil may magnetically induce a current in the second electrical coil.

In one or more instances, the first electrical coil may be connected to the second electrical coil via a hard wire connection. In one or more instances, the mobile device enclosure may include a battery, and the battery in the mobile device enclosure may begin charging once the mobile device has completed charging.

In one or more instances, the mobile device enclosure may be configured to charge the mobile device, using the battery, based on determining that the mobile device is out of power, by inducing a current in the receiver coil based on the second electrical coil. In one or more instances, the mobile device enclosure may be configured to store power, using the battery and without transmitting power to the mobile device, if the mobile device is not within the mobile device enclosure. For example, a user may place the mobile device enclosure on the wireless charging device without the mobile device, and the mobile device enclosure may begin charging without the mobile device.

In one or more instances, the mobile device enclosure may provide the energy (e.g., from its battery) for the wireless power transfer to the mobile device by magnetically inducing a current in the first electrical coil based on the transmitter coil and magnetically inducing the current in the receiver coil based on the second electrical coil.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which illustrate various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1A:
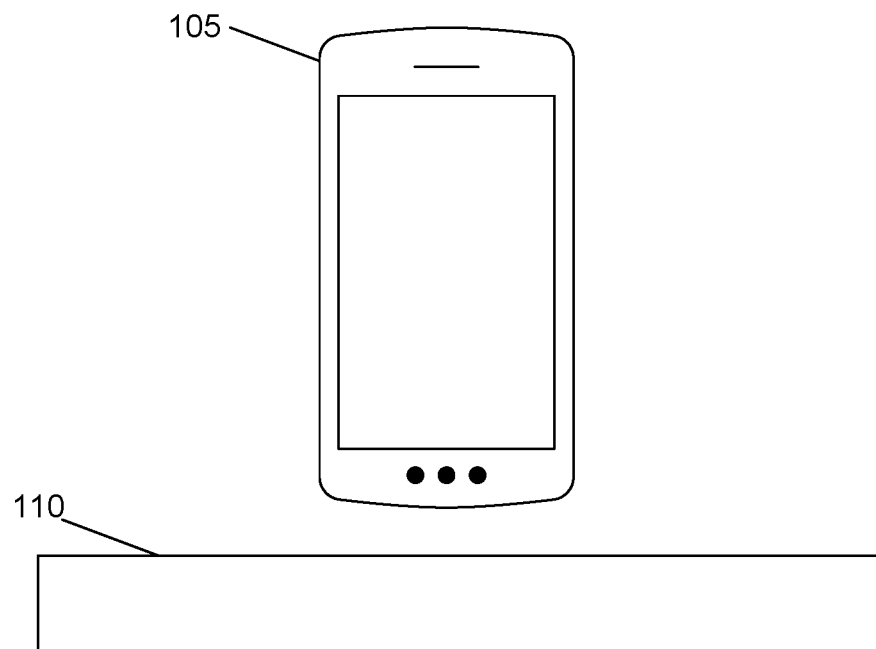
FIGS. 1A and 1B are diagrams illustrating a mobile device and a wireless charging device that may be used to implement aspects of the disclosure.

FIG. 1A illustrates an example hardware environment 100 that may include a mobile device 105 and a wireless charging device 110. In one or more instances, the mobile device 105 may be a smart phone, tablet, smart watch, or other electronic device capable of receiving a wireless charge. In these instances, the mobile device 105 may be configured to receive a wireless charge from the wireless charging device 110. As is described in greater detail below, the mobile device 105 may be configured to receive charge from the wireless charging device 110 using magnetic induction. In one or more instances, the wireless charging device 110 may be a wireless charging pad, or the like, which may be configured to wirelessly charge a mobile device that is placed on the wireless charging device 110. In order to perform such wireless charging, the wireless charging device 110 may be connected to a power source, such as a wall outlet, or may be configured to operate using battery power. Operations of the mobile device 105 and the wireless charging device 110 are described further below with regard to FIG. 1B.

Figure 1B:
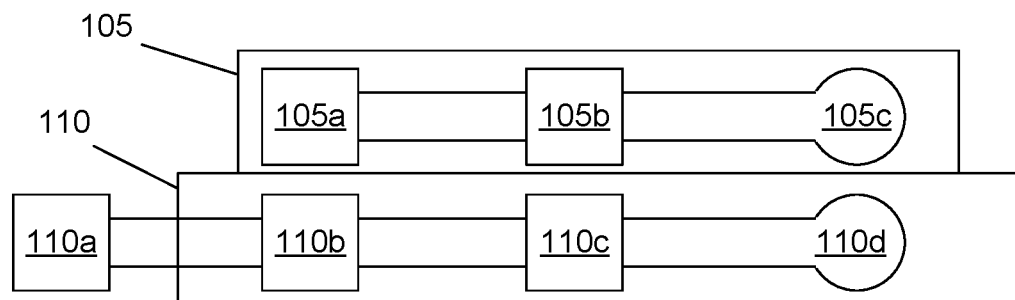

Referring to FIG. 1B, the wireless charging device 110 may be connected to a power source 110a, such as a wall outlet, generator, battery, or the like. In one or more instances, the power source 110a may provide alternating current (AC) to the wireless charging device 110. Additionally or alternatively, the power source 110a may provide direct current (DC) to the wireless charging device 110 (e.g., if the power source is a battery cell, or the like). In instances where alternating current is received by the wireless charging device 110 from the power source 110a, the wireless charging device 110 may route the current to an AC-DC converter to convert the alternating current into a direct current that may be used to charge various devices. In these instances, the wireless charging device 110 may perform an AC-DC-AC conversion process. Alternatively, the wireless charging device 110 may perform an AC-AC conversion using an AC-AC converter. In these instances, the AC-AC converter may convert alternating current of a particular frequency and amplitude to a different frequency and amplitude without converting to direct current as an intermediate step. In either instance, the wireless charging device 110 may excite a transmitter of the wireless charging device 110 with alternating current of a particular frequency and amplitude. In some instances, the wireless charging device 110 may regulate the conversion process (e.g., ensure voltage and/or current are within a predetermined range, or the like). In one or more instances, the wireless charging device 110 may use a rectifier circuit 110b to convert the alternating current into a direct current. After converting the alternating current to direct current, the wireless charging device 110 may use an inverter, such as inverter 110*c*, to convert the direct current back to alternating current. In one or more instances, the wireless charging device 110 may perform this double conversion (e.g., AC to DC and back again) to properly regulate incoming and outgoing voltages, step up/step down the voltages, and/or to ensure the operability of sensitive circuits that may be housed in the wireless charging device 110. The wireless charging device 110 may then route the alternating current to the transmitter coil 110*d*. This may generate a changing magnetic field around the transmitter coil, which may be used to generate current in another coil (e.g., receiver coil 105*c*).

In one or more instances, when the mobile device 105 (and thus the receiver coil 105*c*) are located in close proximity to the wireless charging device 110 (e.g., laying on the wireless charging device 110), current may be generated in the receiver coil 105*c* as a result of the changing magnetic field surrounding the transmitter coil 110*d*. As a result, the receiver coil 105*c* may be magnetically coupled to the transmitter coil 110*d*. Once the current is generated at the receiver coil 105*c*, the mobile device 105 may feed the alternating current through a rectifier 105*b* to generate direct current. The mobile device 105 may then store the energy at the battery 105*a* (e.g., charge the battery).

Accordingly, FIGS. 1A and 1B illustrate a conventional method of performing wireless charging between a mobile device and a wireless charging device. Such a method may adhere to the Qi standard (e.g., version 1.2.4), developed by the Wireless Power Consortium, which states the following principles. 87 to 205 kHz is defined as the typical range for coil operating frequency. With regard to coil area, an outer diameter of about 2 inches and 1.6 inches is standard for transmitters and receivers, respectively. To obtain an efficient power transfer, the transmitter and receiver coils should be identical, the transmitter and receiver coils should be aligned, the distance between the coils should be small relative to an outer diameter of the coils, and magnetic shielding may be used to reduce losses from magnetic field exciting electrical currents in unintended coils/objects The elements of efficient power transfer relating to distance between coils and coil alignment may cause problems for wireless charging of mobile devices because the coil size may be limited by a size of the mobile device. The full standard is available at the Wireless Power Consortium website for members of the organization.

Figure 2A:
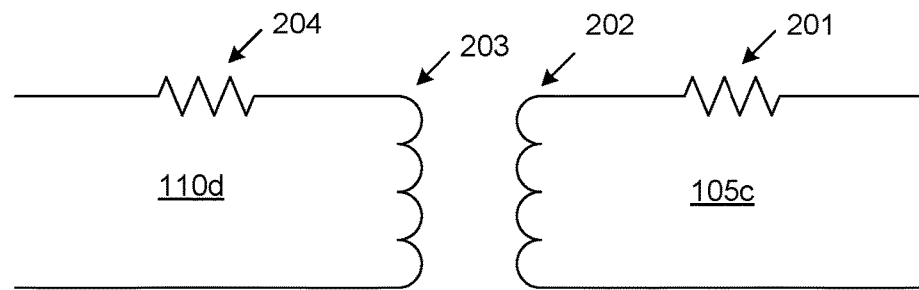
FIGS. 2A-2C are diagrams illustrating schematics for wireless power transmission according to one or more aspects of the disclosure.

FIG. 2A illustrates a coupling between the transmitter coil 110*d* and the receiver coil 105*c*, as described above with regard to FIG. 1B (e.g., a basic transformer model). For example, the transmitter coil 110*d* may be modeled as a resistor 204 and an inductor 203. In one or more instances, the resistor 204 and the inductor 203 may be connected in series. For example, the transmitter coil 110*d* may have an inductance of $L_T$. The receiver coil 105*c* may include a resistor 201 and an inductor 202. In one or more instances, the resistor 201 and the inductor 202 may be connected in series. In these instances, mutual inductance may be produced between the transmitter coil 110*d* and the receiver coil 105*c*. In one or more instances, this mutual inductance (M) may be correlated with $L_T$ and the inductance of the receiver coil 105*c* ($L_R$) via the following relationship:

$$M = k\sqrt{L_T L_R} \quad (1)$$

In these instances, k may be a coupling coefficient, which may be defined between 0 and 1. In one or more instances, as coil separation increases and/or coil offset increases, mutual inductance and the coupling coefficient between the coils may decrease. In these instances, a leakage inductance may be produced, as described below with regard to FIG. 2B.

Figure 2B:
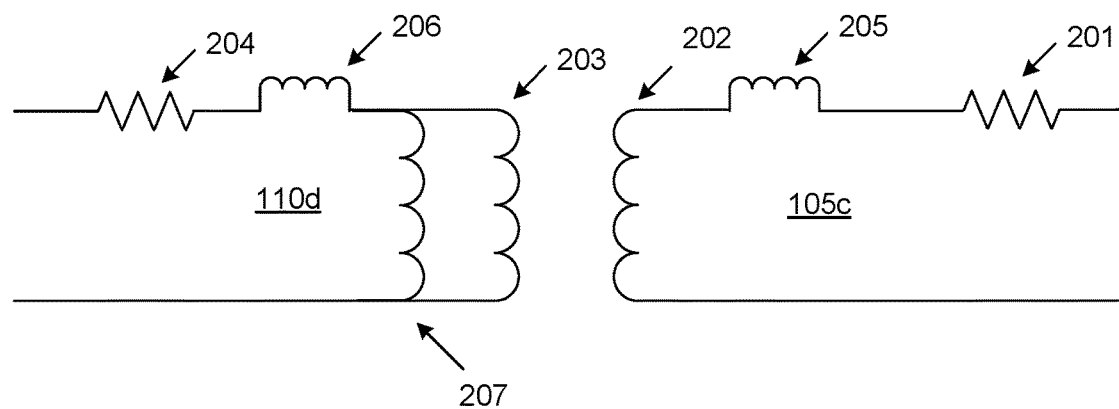

FIG. 2B illustrates the aforementioned leakage inductance resulting from increased coil separation. For example, as a distance between the transmitter coil 110*d* and the receiver coil 105*c* is increased, the transmitter coil 110*d* may produce a magnetic inductance (nM) 207. In these instances, n may refer to a turns ratio between the transmitter coil 110*d* and the receiver coil 105*c* (e.g., a ratio of a number of loops forming each of the transmitter coil 110*d* and the receiver coil 105*c*). In these instances, the leakage inductance 206 at the transmitter coil 110*d* may be determined using the following relationship:

$$\text{Leakage inductance } 206 = L_T - nM \quad (2)$$

In addition, in these instances, the receiver coil 105*c* may produce a leakage inductance 205. This leakage inductance 205 at the receiver coil 105*c* may be determined using the following relationship:

$$\text{Leakage inductance } 205 = L_R - \frac{M}{n} \quad (3)$$

Figure 2C:
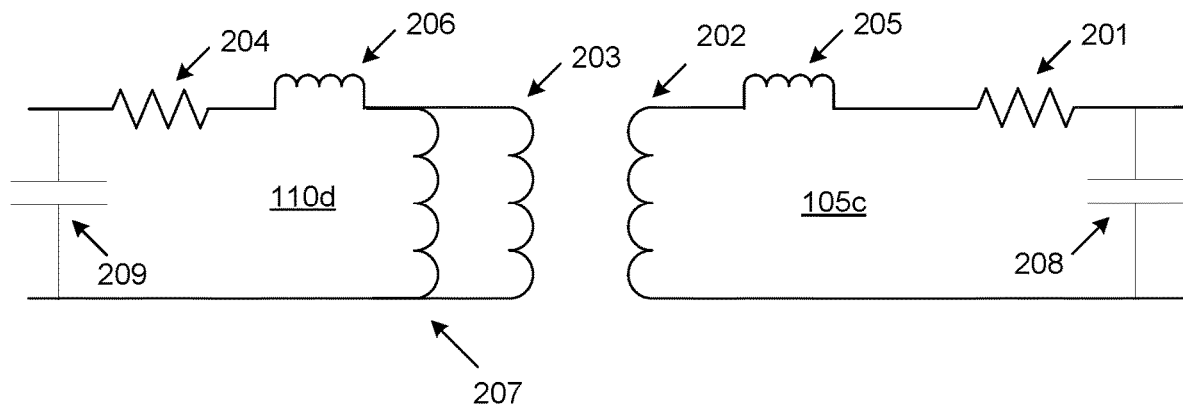

In these instances, the coupling coefficient may decrease. Accordingly, unless increased, the current in the transmitter coil 110*d* and the receiver coil 105*c* might not be high enough to excite magnetizing inductance to produce a desired power output (e.g., to charge the mobile device 105). In these instances, as coil separation increases, efficiency of the wireless power transfer between the transmitter coil 110*d* and the receiver coil 105*c* may decrease. FIG. 2C, described below, presents modifications to the transmitter coil 110*d* and the receiver coil 105*c* that may improve the efficiency of the wireless power transfer.

Referring to FIG. 2C, a schematic is shown that may provide a more efficient wireless power transfer than the schematic in FIG. 2B. For example, such efficiency may be improved through resonant based magnetic induction. Accordingly, a discrete capacitor 209 may be added to the transmitter coil 110*d* and/or the transmitter coil 110*d* may have an inherent distributed capacitance by design. Similarly, a discrete capacitor 208 and/or a specific amount of capacitance may be added to the receiver coil 105*c*. In one or more instances, an ideal amount of capacitance may be a function of coil parameters, coil coupling, receiver load, operating frequency, or the like corresponding to the discrete capacitor 208 and the discrete capacitor 209. In these instances, the ideal capacitance may be determined via the following relationship:

$$C = \frac{1}{w^2 L_L} \quad (4)$$

In instances where the transmitter coil 110*d* is identical to the receiver coil 105*c*, w may be an angular frequency and Li may be the coil leakage inductance. In one or more instances, a coupling between the transmitter coil 110*d* and the receiver coil 105*c* might not be fixed and/or well controlled. In these instances, the ideal capacitance may be unknown. As a result, the transmitter coil 110*d* may tune an operating frequency in real time based on feedback from the receiver coil 105*c* during resonant based magnetic induction. In these instances, the transmitter coil 110*d* and the receiver coil 105c may be configured in accordance with the Qi standard or some other open or proprietary wireless power transfer standard, and may be configured to support efficient power transfer over a range of relative coil positions through the use of an allocated frequency range.

Such techniques for wireless power transfer may be used in the charging of wireless client devices such as the mobile device 105. However, problems may arise through implementation of these techniques in various situations as discussed below.

Figure 3A:
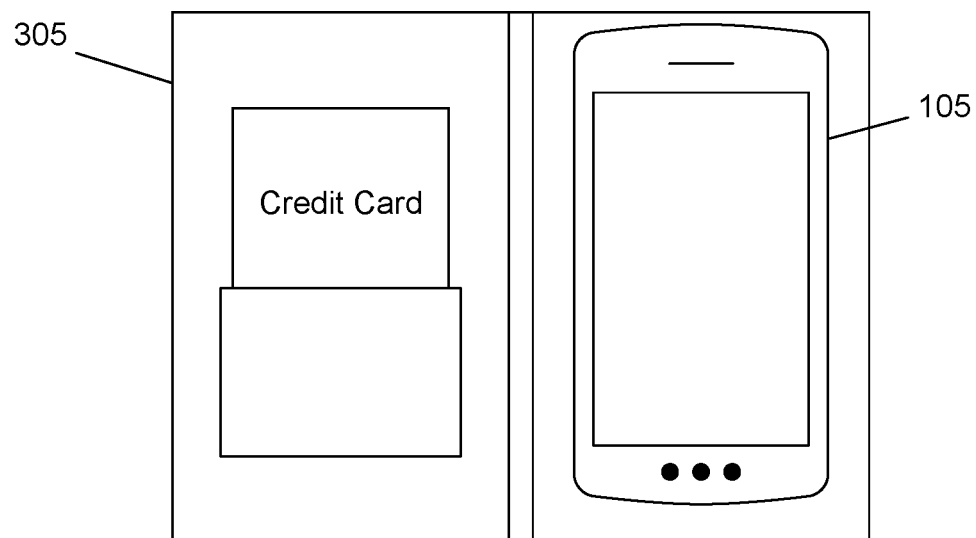
FIGS. 3A and 3B are diagrams illustrating a mobile device wallet according to one or more aspects of the disclosure.

FIG. 3A illustrates a first wireless charging device enclosure embodiment. For example, in some instances, a user may keep the mobile device 105 in a mobile device wallet 305. This mobile device wallet 305 may be used to provide protection for the mobile device 105 and may hold additional personal items (e.g., a credit card, cash, driver's license, or the like). Although the mobile device wallet 305 may provide numerous beneficial purposes, it may cause difficulty in wireless charging as shown below with regard to FIG. 3B.

Figure 3B:

Referring to FIG. 3B, which shows the mobile device 105, inside of the mobile device wallet 305, laying on the wireless charging device 110 for purposes of receiving a wireless power transfer. As is evident from FIG. 3B, the mobile device wallet 305 may increase a distance between the wireless charging device 110 and the mobile device 105. As described above, increasing this distance may, in some instances, cause wireless charging to occur at a reduced efficiency level (e.g., when compared to a scenario where the mobile device 105 is place directly on the wireless charging device without the mobile device wallet 305). For example, a higher leakage inductance may be generated in these instances. In other instances, increasing this distance may move the mobile device 105 outside of a range within which the wireless charging device 110 may provide power. Additionally or alternatively, the material making up the mobile device wallet 305 may also impede the wireless power transfer. In each scenario, the mobile device wallet 305 negatively affects the wireless power transfer between the wireless charging device 110 and the mobile device 105.

Figure 4A:
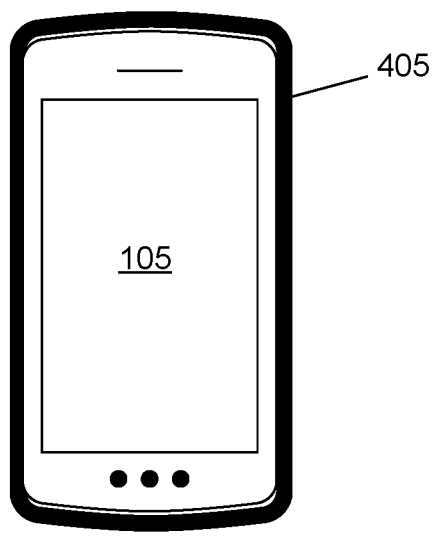
FIGS. 4A and 4B are diagrams illustrating a mobile device case according to one or more aspects of the disclosure.

FIG. 4A illustrates a second wireless charging device enclosure embodiment. For example, in some instances, a user may keep the mobile device 105 in a mobile device case 405. Similar to the mobile device wallet 305, the mobile device case 405 may be used to provide protection for the mobile device 105, but may be smaller and less cumbersome than the mobile device wallet 305. In one or more instances, the mobile device case 405 may cause difficulty in wireless charging for similar reasons to those described above with regard to the mobile device wallet 305, and as shown below with regard to FIG. 4B.

Figure 4B:
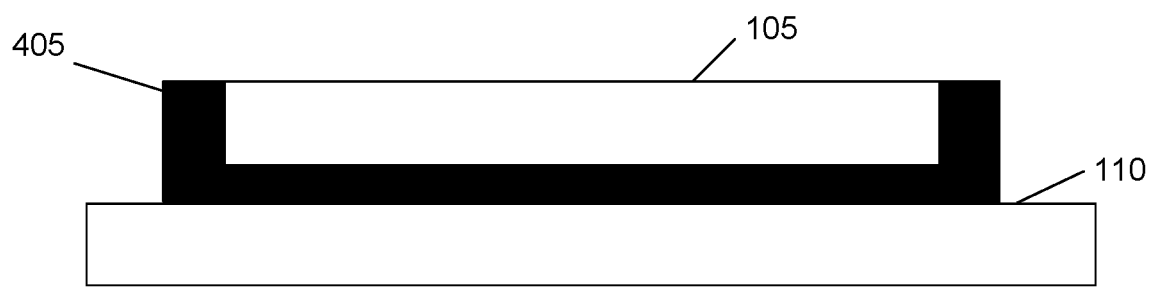

Referring to FIG. 4B, which shows the mobile device 105, inside of the mobile device case 405, laying on the wireless charging device 110 for purposes of receiving a wireless power transfer. As is evident in FIG. 4B, the mobile device case 405 may increase a distance between the wireless charging device 110 and the mobile device 105. As described above, increasing this distance may, in some instances, cause wireless charging to occur at a reduced efficiency level (e.g., when compared to a scenario where the mobile device 105 is placed directly on the wireless charging device without the mobile device case 405). For example, a higher leakage inductance may be generated in these instances. In other instances, increasing this distance may move the mobile device 105 outside of a range within which the wireless charging device 110 may provide power. Additionally or alternatively, the material making up the mobile device case 405 may also impede the wireless power transfer. In each scenario, the mobile device case 405 negatively affects the wireless power transfer between the wireless charging device 110 and the mobile device 105.

Figure 5A:
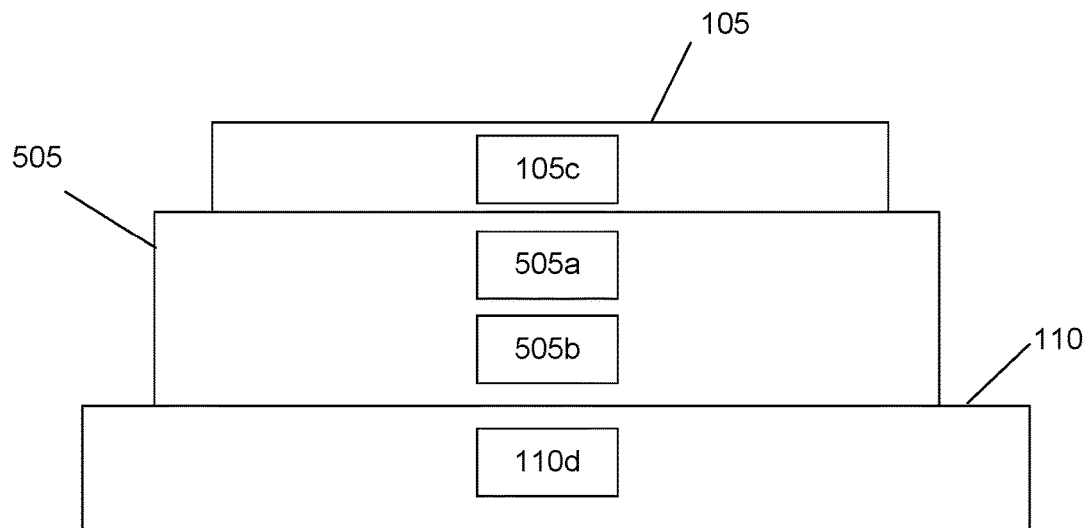
FIGS. 5A-5D are diagrams illustrating the use of electrical coils within a mobile device enclosure according to one or more aspects of the disclosure.
Figure 5B:
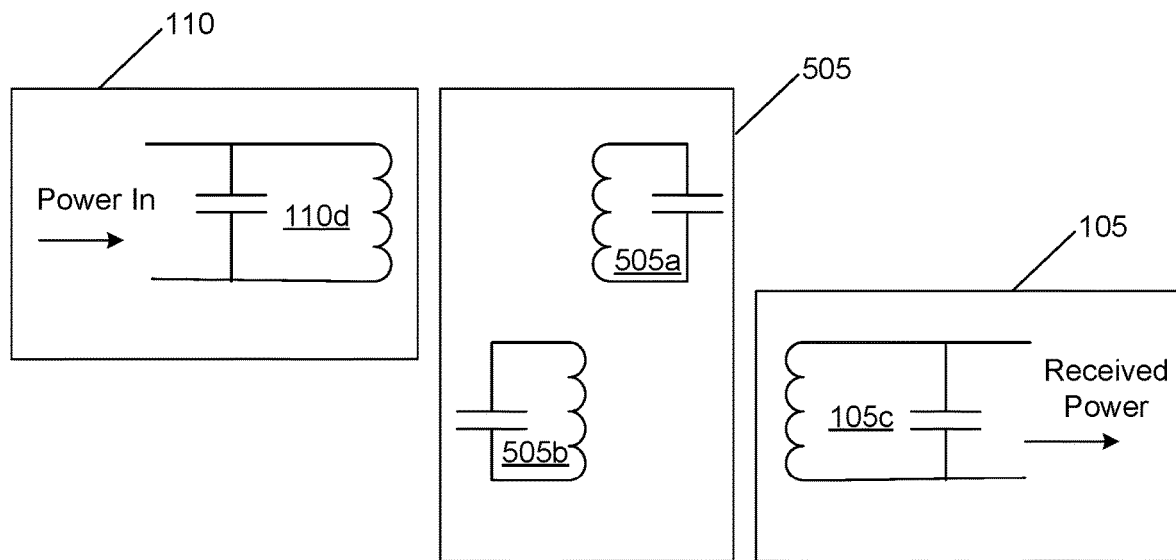
Figure 5C:
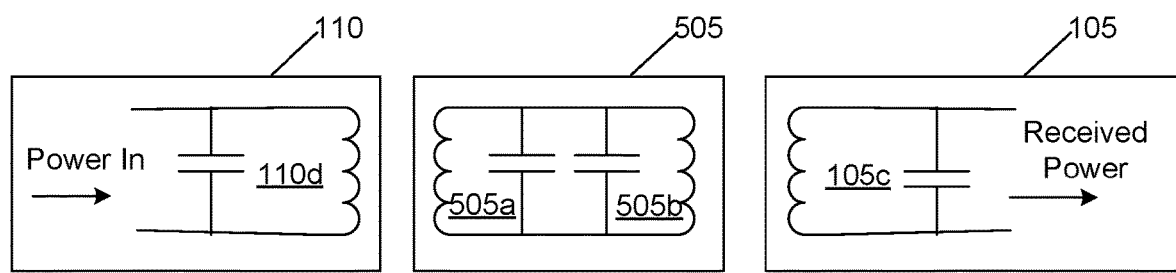

FIGS. 5A-5C illustrate a solution to the problems described herein with regard to wireless charging of mobile devices. Referring to FIG. 5A, an arrangement of the mobile device 105, the wireless charging device 110, and a mobile device enclosure 505 is described. In this arrangement, the mobile device 105 may be laying on the wireless charging device 110 and the mobile device enclosure 505 may form a layer between the mobile device 105 and the wireless charging device 110 such that the mobile device 105 is not directly touching the wireless charging device 110. In one or more instances, the mobile device enclosure 505 may be a mobile device wallet (e.g., mobile device wallet 305), a mobile device case (e.g., mobile device case 405), or the like. As described above with regard to FIG. 1B, the mobile device 105 may include a receiver coil 105c and the wireless charging device 110 may include a transmitter coil 110d. To address the problems associated with wireless charging in the presence of a mobile device enclosure (e.g., due to the increased distance between the mobile device 105 and the wireless charging device 110, a type of material of the wireless charging enclosure, or the like), two electrical coils may be added to the mobile device enclosure 505. In these instances, a first electrical coil 505a and a second electrical coil 505b may be integrated into the mobile device enclosure 505.

In one or more instances, dimensions of the first electrical coil 505a and the second electrical coil 505b may be substantially the same, and may be an average between the dimensions of the transmitter coil 110d and the receiver coil 105c. In these instances, the transmitter coil 110d and the receiver coil 105c may be manufactured and/or designed by different entities (e.g., a phone enclosure manufacturer, a wireless charging station manufacturer, or the like), and thus dimensions of the transmitter coil 110d and the receiver coil 105c may be different. In these instances, for example, diameters, number of windings, or the like of the first electrical coil 505a and the second electrical coil 505b may be an average of the diameters, number of windings, or the like of the transmitter coil 110d and the receiver coil 105c. In other instances, the transmitter coil 110d and the receiver coil 105c may have substantially the same dimensions, and thus the dimensions of the first electrical coil 505a and the second electrical coil 505b may be substantially the same as the dimensions of the transmitter coil 110d and the receiver coil 105c. In these instances, the transmitter coil 110d and the receiver coil 105c may establish a stronger wireless coupling with the first electrical coil 505a and the second electrical coil 505b, respectively, than instances in which the transmitter coil 110d and the receiver coil 105c have different dimensions than the first electrical coil 505a and the second electrical coil 505b. Further, in these instances, each of the first electrical coil 505a and the second electrical coil 505b may be self-resonating coils.

In one or more instances, dimensions of the first electrical coil 505a and the second electrical coil 505b may be based on a size of the mobile device enclosure 505. For example, if a first mobile device enclosure is larger than a second mobile device enclosure, the first mobile device enclosure may have larger electrical coils than the second mobile device enclosure. In one or more instances, dimensions of the first electrical coil 505a and the second electrical coil 505b may be based on the recommendations and criteria of the Qi standard.

In one or more instances, a wire thickness of the first electrical coil 505a and the second electrical coil 505b may be substantially the same, and may be selected to minimize loss due to ohmic heating. In these instances, the wire thickness may be chosen based on the recommendations and criteria of the Qi standard.

In one or more instances, the first electrical coil 505a and the second electrical coil 505b may be integrated into the mobile device enclosure 505 using conventional techniques for making and embedding radio frequency identification (RFID) tags. For example, the first electrical coil 505a and the second electrical coil 505b may be integrated into a flexible printed wiring board (PWB). In this example, the first electrical coil 505a and the second electrical coil 505b may be printed onto the flexible PWB, and the flexible PWB may be integrated into an outer layer of the mobile device enclosure 505. As another example, the first electrical coil 505 and the second electrical coil 505b may be laminated and integrated into an outer layer of the mobile device enclosure 505.

Accordingly, and as described further below with regard to FIGS. 5B-5C, the wireless power transfer may occur from the transmitter coil 110d, through the first electrical coil 505a and the second electrical coil 505b, and into receiver coil 105c of the mobile device 105, rather than merely from the transmitter coil 110d and to the receiver coil 105c through the mobile device enclosure 505. In one or more instances, by adding coils designed to resonate by themselves or with discrete capacitance added within, a practical range of wireless charging may be extended between the wireless charging device 110 and the mobile device 105. Two embodiments of this design are further described below with regard to FIGS. 5B and 5C.

Referring to FIG. 5B, power may flow into the wireless charging device 110 from a power source, and alternating current in the transmitter coil 110d may result in a changing magnetic field at the transmitter coil 110d. This process is further described above with regard to FIG. 1B. Rather than causing mutual inductance between the transmitter coil 110d and the receiver coil 105c, as described above, mutual inductance may be caused between the transmitter coil 110d and the first electrical coil 505a, located in the mobile device enclosure 505. For example, the transmitter coil 110d and the first electrical coil 505a may establish a wireless coupling. In one or more instances, the transmitter coil 110d and the first electrical coil 505a may be magnetically coupled. In one or more instances, the first electrical coil 505a may be modeled as an inductor and a capacitor in parallel with the inductor coupled to the transmitter coil 110d. Once alternating current is induced in the first electrical coil 505a, the first electrical coil 505a may establish mutual inductance, a wireless coupling, and/or a magnetic coupling with the second electrical coil 505b, located in the mobile device enclosure 505. In one or more instances, the second electrical coil 505b may include an inductor and a capacitor connected in parallel. Once current is induced at the second electrical coil 505b, the second electrical coil 505b may establish mutual inductance, wireless coupling, and/or magnetic coupling with the receiver coil 105c, resulting in induction of current at the receiver coil 105c, which may be used to charge a battery at the mobile device 105. Accordingly, by channeling power to the receiver coil 105c, the first electrical coil 505a and the second electrical coil 505b may improve the efficiency of power transfer.

It should be understood that although FIG. 5B shows the first electrical coil 505a and the second electrical coil 505b stacked on top of each other, in one or more instances, the first electrical coil 505a and the second electrical coil 505b might not be stacked on top of each other, yet may still establish a wireless coupling. For example, in some instances, the first electrical coil 505a and the second electrical coil 505b may be located side by side. However, small proximity between the first electrical coil 505a and the second electrical coil 505b, and close alignment of their respective axes may increase strength of the wireless coupling between the first electrical coil 505a and the second electrical coil 505b.

Furthermore, effects of a material of the mobile device enclosure 505 on induction may be reduced by shortening the distance over which mutual induction occurs. This may decrease both the efficiency and practical range of wireless charging for mobile devices enclosed by a case, wallet, or the like. Additionally, detrimental effects from the proximity of undesired materials may be reduced through the use of frequency tuning, as described in the Qi standard. In one or more instances, the transmitter coil 110d may tune the frequency based on feedback from the receiver coil 105c. In these instances, the transmitter coil 110d may optimize the frequency in real-time using one or more algorithms. For example, the transmitter coil 110d may perturb the frequency and determine whether it increased or decreased power transfer. In this example, if the transmitter coil 110d determines that the power transfer was increased, the transmitter coil may maintain the new frequency. If the transmitter coil 110d determines that the power transfer was decreased, the transmitter coil 110d may perturb the frequency in the opposite direction. FIG. 5C illustrates a similar wireless charging configuration to that described above with regard to FIG. 5B. However, rather than causing mutual induction between the first electrical coil 505a and the second electrical coil 505b at the mobile device enclosure 505 (as shown in FIG. 5B), FIG. 5C illustrates an embodiment in which the first electrical coil 505a is connected to the second electrical coil 505b via a hard wire connection. In one or more instances, the wireless power transfer occurring via the configuration shown at FIG. 5C may be more efficient that the wireless power transfer occurring via the configuration shown at FIG. 5B because the current may flow directly to the second electrical coil 505b through a hard wire rather than depending on a wireless coupling between the first electrical coil 505a and the second electrical coil 505b.

Accordingly, by implementing the configurations shown in FIGS. 5B and 5C, the practical range for charging a mobile device, associated with a mobile device enclosure, via wireless charging may be extended.

Figure 5D:
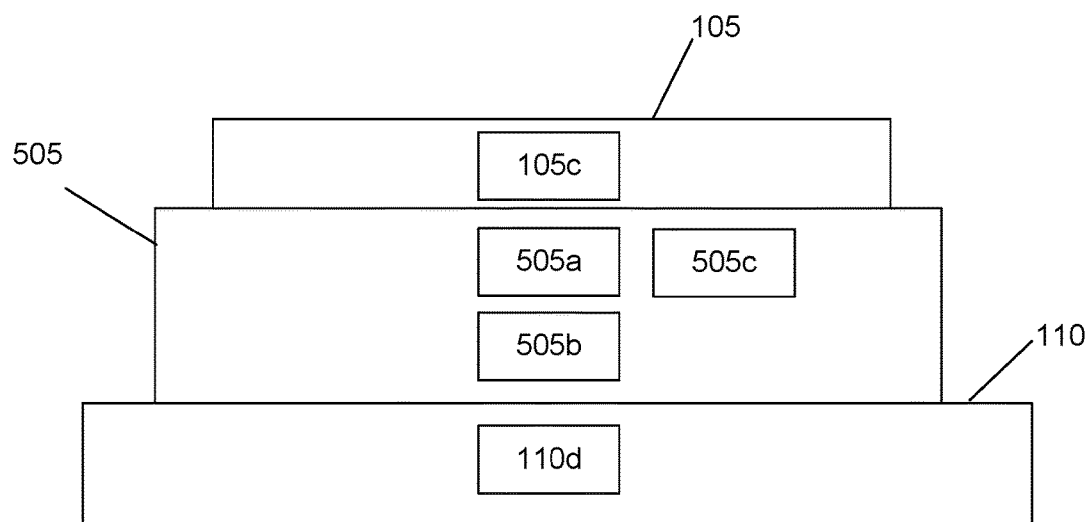

In one or more instances, as shown in FIG. 5D, the mobile device enclosure 505 described above may also be configured with a battery 505c that may receive and store charge under certain situations. For example, the mobile device enclosure 505 may include the first electrical coil 505a, the second electrical coil 505b, and the battery 505c. If the mobile device 105 reaches a complete charge, the battery 505c may begin to charge. Accordingly, in some instances, when the mobile device 105 is removed from the wireless charging device 110, it may begin receiving charge from the battery 505c if the mobile device 105 is at less than full charge. Similarly, in one or more instances, the mobile device 105 might not be in the mobile device enclosure 505. In these instances, the mobile device enclosure 505 may still be placed on the wireless charging device 110, and may be configured to wirelessly receive and store a charge. For example, as described above, mutual inductance may be caused between the transmitter coil 110d and the first electrical coil 505a, located in the mobile device enclosure 505. The first electrical coil 505a may be either magnetically coupled or connected via a hard wire connection to the second electrical coil 505b. In either case, power may be transferred from the first electrical coil 505a to the second electrical coil 505b, and then subsequently to the battery 505c.

Although the figures and description herein primarily describe a mobile device enclosure (e.g., a case, wallet, or the like) to house the first electrical coil 505a and the second electrical coil 505b, it should be understood that the first electrical coil 505a and the second electrical coil 505b may be embedded into a detachable portion of a mobile device (e.g., a detachable battery cover or the like). For example, the first electrical coil 505a and the second electrical coil 505b may be located in the detachable portion of the mobile device 105, and may be used to perform a wireless power transfer as described herein. Additionally, the first electrical coil 505a and the second electrical coil 505b may be implemented in any other way so as to cause the first electrical coil 505a and the second electrical coil 505b to be placed between the transmitter coil 110d and the receiver coil 105c. Additionally, it should be understood that although the embodiments described herein utilize two electrical coils in the mobile device enclosure, it should be understood that other numbers of electrical coils (e.g., one coil, three coils, or the like) may be implemented in the mobile device enclosure to maximize charging capabilities (e.g., based on dimensions, parameters, or the like corresponding to the mobile device enclosure). For example, in one or more instances, the mobile device enclosure may include a third electrical coil in addition to the first electrical coil 505a and the second electrical coil 505b. In these instances, the second electrical coil 505b may establish a wireless coupling with the third electrical coil and induce a current in the third electrical coil. Alternatively, the third electrical coil may be connected to the second electrical coil 505b via a hard wire connection, and current may flow directly from the second electrical coil 505b to the third electrical coil. In either instance, the third electrical coil may establish a wireless coupling with the receiver coil 105c in the mobile device 105, and may induce a current in the receiver coil 105c. Accordingly, the wireless charging device 110 may charge the mobile device 105 through the mobile device enclosure 505 (e.g., through first electrical coil 505a, the second electrical coil 505b, and the third electrical coil), in a similar method as described above with regard to the two coil configuration.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
    a first electrical coil configured to establish a first wireless coupling with a transmitter coil of a power supply; and
    a second electrical coil configured to establish a second wireless coupling with the first electrical coil and to establish a third wireless coupling with a receiver coil of an electronic device, wherein:
        the first wireless coupling, the second wireless coupling, and the third wireless coupling, when established, extend a range over which the transmitter coil is capable of performing a wireless power transfer to the receiver coil, and
        a number of windings of the first electrical coil and the second electrical coil is an average of a number of windings for the receiver coil and a number of windings for the transmitter coil, wherein the number of windings for the receiver coil is different than the number of windings for the transmitter coil.

2. The apparatus of claim 1, wherein the first electrical coil is connected in parallel with a capacitor to create a sub-circuit, and wherein the capacitor causes the sub-circuit to resonate at a predetermined frequency.

3. The apparatus of claim 1, wherein the first electrical coil and the second electrical coil are integrated into one of: an electronic device case, an electronic device wallet, and a removable portion of the electronic device.

4. The apparatus of claim 1, wherein the first electrical coil and the second electrical coil comprise self-resonating coils.

5. The apparatus of claim 1, wherein wireless power transfer via the first wireless coupling, the second wireless coupling, and the third wireless coupling occurs with a first leakage inductance and wherein the first leakage inductance is less than a second leakage inductance corresponding to wireless power transfer via a single wireless coupling between the transmitter coil and the receiver coil.

6. The apparatus of claim 1, wherein a distance between the receiver coil and the transmitter coil exceeds a range over which the transmitter coil is able to transfer power to the receiver coil via a single wireless coupling between the transmitter coil and the receiver coil.

7. An apparatus comprising:
    a first electrical coil configured to establish a first wireless coupling with a transmitter coil of a power supply; and
    a second electrical coil configured to establish a second wireless coupling with a receiver coil of an electronic device, wherein:
        the first electrical coil and the second electrical coil are connected via a hard wire connection;
        the first wireless coupling and the second wireless coupling, when established, extend a range over which the transmitter coil is capable of performing a wireless power transfer to the receiver coil; and
        a number of windings of the first electrical coil and the second electrical coil is an average of a number of windings for the receiver coil and a number of windings for the transmitter coil, wherein the number of windings for the receiver coil is different than the number of windings for the transmitter coil.

8. The apparatus of claim 7, wherein performing the wireless power transfer to the receiver coil comprises:
    causing mutual inductance between:
        the transmitter coil and the first electrical coil, and
        the second electrical coil and the receiver coil.

9. The apparatus of claim 7, wherein:
    the first electrical coil comprises a first inductor connected in parallel to a first capacitor;
    the second electrical coil comprises a second inductor connected in parallel to a second capacitor; and
    the first electrical coil is connected in parallel to the second electrical coil.

10. The apparatus of claim 7, wherein the first electrical coil and the second electrical coil are integrated into one of: an electronic device case, an electronic device wallet, and a removable portion of the electronic device.

11. The apparatus of claim 7, wherein a diameter of the first electrical coil and the second electrical coil is an average of a diameter for the receiver coil and a diameter for the transmitter coil.

12. The apparatus of claim 7, wherein a diameter of the first electrical coil, a diameter of the second electrical coil, a diameter for the receiver coil, and a diameter for the transmitter coil are greater than a distance between each of the first electrical coil, the second electrical coil, the receiver coil, and the transmitter coil.

13. The apparatus of claim 7, wherein a distance between the receiver coil and the transmitter coil exceeds a range over which the transmitter coil is able to transfer power to the receiver coil via a single wireless coupling between the transmitter coil and the receiver coil.

14. A system comprising:
  a power terminal configured to provide a wireless power transfer to an electronic device when the electronic device is located within a baseline distance of the power terminal; and
  an electronic device enclosure configured to hold the electronic device, wherein the electronic device enclosure comprises:
    a first electrical coil, magnetically coupled to a transmitter coil of the power terminal, configured to receive the wireless power transfer from the transmitter coil; and
    a second electrical coil configured to receive the wireless power transfer from the first electrical coil,
  wherein the electronic device comprises a receiver coil, magnetically coupled to the second electrical coil, wherein the second electrical coil extends a range over which the transmitter coil is capable of performing a wireless power transfer to the receiver coil, and
  wherein a number of windings of the first electrical coil and the second electrical coil is an average of a number of windings for the receiver coil and a number of windings for the transmitter coil, wherein the number of windings for the receiver coil is different than the number of windings for the transmitter coil.

15. The system of claim 14, wherein the first electrical coil and the second electrical coil enable the power terminal to provide the wireless power transfer to the electronic device when the electronic device is located within an updated distance of the power terminal, wherein the updated distance is greater than the baseline distance.

16. The system of claim 14, wherein the first electrical coil is magnetically coupled to the second electrical coil.

17. The system of claim 16, further comprising magnetically inducing, using the first electrical coil, a current in the second electrical coil.

18. The system of claim 14, wherein the first electrical coil is connected to the second electrical coil via a hard wire connection.

19. The system of claim 14, wherein the electronic device enclosure includes a battery, and wherein the electronic device enclosure is further configured to begin charging, using the battery, once the electronic device has completed charging.

20. The system of claim 19, wherein the electronic device enclosure is configured to charge the electronic device, using the battery, based on determining that the electronic device is out of power, wherein the electronic device enclosure charges the electronic device by inducing a current in the receiver coil based on the second electrical coil.

* * * * *